Jan. 27, 1970  R. W. SMOUTON ET AL  3,491,649
RIVETS
Filed Aug. 1, 1968
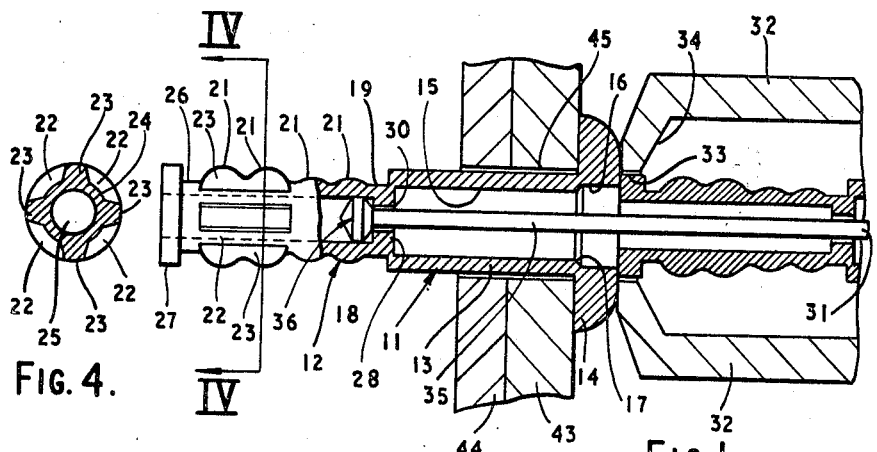
FIG. 4.
FIG. 1.
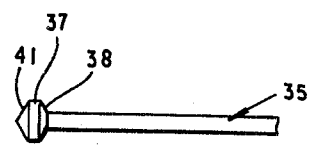
FIG. 5
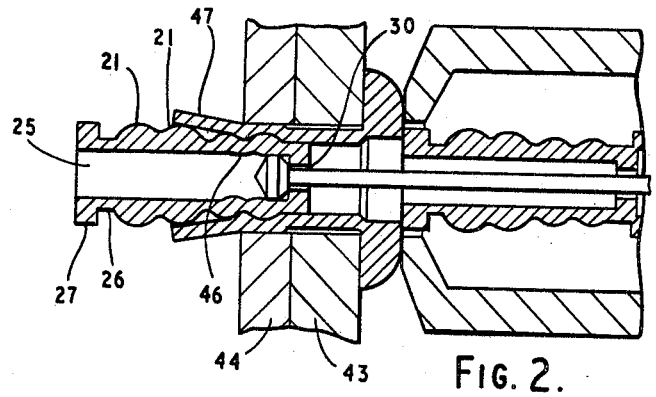
FIG. 2.
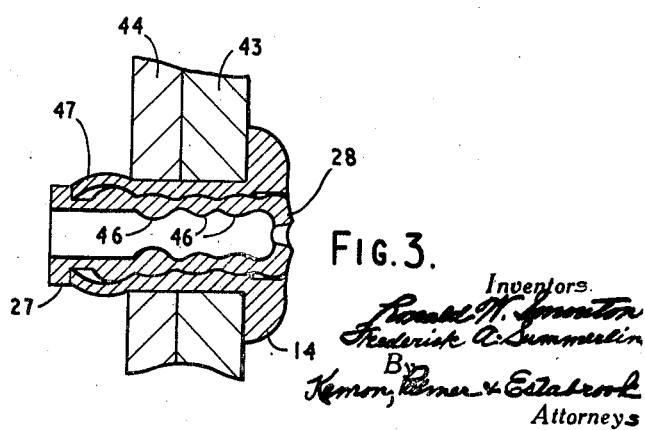
FIG. 3.
Inventors
Ronald W. Smouton
Frederick A. Summerlin
By
Kenyon, Kenyon & Estabrook
Attorneys

United States Patent Office 3,491,649
Patented Jan. 27, 1970

3,491,649
RIVETS
Ronald William Smouton, Ware, and Frederick Arthur Summerlin, Harpenden, England, assignors, by mesne assignments, to Aerpat A.G., Zug, Switzerland, a company of Switzerland
Filed Aug. 1, 1968, Ser. No. 749,372
Claims priority, application Great Britain, Aug. 9, 1967, 36,589/67
Int. Cl. F16b 13/04, 33/04
U.S. Cl. 85—78                         2 Claims

ABSTRACT OF THE DISCLOSURE

A blind rivet of substantially resilient nylon material comprises a shell having an enlarged head at one end; a plug at the tail end of the shell; and a central longitudinal bore extending completely through the rivet. The plug has an inwardly extending flange at the end nearer the shell, and the bore of the shell has a corresponding enlargement at its head end. The plug is pulled into the shell by means of a nonexpandable mandrel with a head which engages the flange. When the flange reaches the enlargement in the shell bore the flange expands radially outward into the enlargement, thus releasing the mandrel head.

---

The invention relates to rivets, and more particularly to blind rivets, that is to say rivets which are capable of installation in workpieces to be riveted thereby by access to one side only of the workpieces.

It is an object of the invention to provide a blind rivet which can be cheaply produced in very large numbers by moulding, and can be rapidly installed in quick repetition from a column of rivets loaded on to the mandrel of a repetition placing tool.

It is a further object of the invention to provide such a rivet which can be installed in workpieces having a relatively wide range of grip lengths.

Further objects of the invention will become apparent from the following description.

A specific embodiment of the invention will now be described by way of example and with reference to the accompanying drawings, in which:

FIGURE 1 is an axial section through a rivet ready for riveting inserted through aligned apertures in workpieces, including part of the tool used (part of the rivet plug being shown not in section);

FIGURE 2 is a similar view, showing the plug of the rivet partially drawn into the shell;

FIGURE 3 is a similar view, showing the plug fully drawn into the shell, with the mandrel having been removed from the rivet;

FIGURE 4 is a section through the rivet on the line IV—IV of FIGURE 1; and

FIGURE 5 is an elevation of the head and adjacent part of the stem of the mandrel.

The rivet of this example is moulded from nylon-66 material, which is substantially resilient, although a small amount of permanent set may be imparted to it by the application of sufficient stress. The rivet comprises a tubular shell 11 and a tubular plug 12. The shell comprises a cylindrical shank 13 which has at one end a radially enlarged head 14 which, in this example, is in the form of a snap head. The shell has a central cylindrical bore 15 extending throughout its length. The headmost part of the bore has a radial enlargement 16, which, in this example, lies completely within the thickness of the head 14. The enlargement 16 is joined to the bore 15 by means of frustoconical face 17.

In this example, the plug 12 is formed integrally with the shell, the end of the plug nearest the head of the shell being joined to the tailmost part of the shell by a thin annular web portion 18. The exterior of the plug has the end part 19 thereof which is adjacent to the tail of the shell cylindrical, i.e. of uniform diameter. However, the greater part of the length of the exterior of the plug is in the form of circumferential corrugations 21, the corrugations more remote from the end 19 of the plug being slightly larger in diameter than those nearer the end 19. Part of this corrugated portion of the plug (in this example, about half) which is remote from the part 19 of the plug has four longitudinal grooves 22 equally spaced circumferentially around its exterior, in effect leaving four longitudinal ribs 23 which, of course, have wavy or sinuous crests due to the corrugated shape of the longitudinal profile of the plug at this part. It will be noted that, in this example, the ribs 23 are relatively thin and therefore fairly easily deformed, the bottom of each groove 22 being provided by a thin web 24 which forms the core of the plug and immediately surrounds bore 25 which extends longitudinally through the plug. Beyond the end corrugation 21 the exterior of the plug has another short cylindrical portion 26. The end of the plug remote from the shell is formed with a radially outwardly extending flange 27, which extends outwardly at least as far as the crest of the highest corrugation 21, and has the same outside diameter as the shank 13 of the shell. The end of the plug adjacent the shell is formed with a protrusion into the bore 25, in the form of a radially inwardly extending flange 28. Thus the bore through the plug has a restriction 30 in diameter at the end of the plug adjacent the shell. The exterior diameter of the plug at the part 19 adjacent the shell (and at the part 26) is equal to the interior diameter of the bore 15 of the shell. The length of the plug is substantially equal to the length of the shell.

In use, rivets are placed by means of a repetition riveting tool, the relevant parts of which are illustrated in FIGURES 1 and 2. The tool comprises a mandrel 31 mounted for manually-operated or power-operated reciprocation (e.g. by means of a pneumatic or hydraulic piston-and-cylinder arrangement) with respect to the body of the tool. Mounted on the body of the tool is a jaw assembly including a pair of jaws 32 which are spring urged together into the position shown in FIGURES 1 and 2 and can open to a limited extent by pivoting about a point off the drawing to the right in FIGURES 1 and 2. The jaws have a circular mouth opening 33 which is sufficiently large to allow the cylindrical shank 13 of the rivet shell, and the flange 27, through the mouth with clearance. In order that rivet heads 14 may pass out through the jaws (from right to left as shown in FIGURES 1 and 2), the part of the jaws immediately inside the mouth is tapered as shown at 34. The mandrel 31 is supported passing centrally through the mouth 33. It comprises a cylindrical stem 35 which is a clearance fit through the restricted part 30 of the rivet plug bore, and a radially enlarged head 36. The head 36 is circular in section and has a central cylindrical part 37 which is a clearance fit inside the bore 25 of the rivet plug. From the cylindrical portion 37 the mandrel head tapers toward the stem 35 by means of a frustoconical face 38 at about 110° included angle. The mandrel head 36, on the side thereof away from the mandrel stem 35, is of similar form, having a conical face 41.

In use, a succession of the rivets are loaded on to the mandrel stem 31, with the plug end of each rivet towards the head of the mandrel and the free end of the plug abutting the head of the next adjacent rivet. The column of rivets is urged towards the head end of the mandrel by means of a suitable device (which may be mechanical or pneumatic), and which is preferably spring buffered. The outermost end rivet of the column is retained on the mandrel by the frustoconical face 38 of the mandrel head butting against the flange 28 at the shell end of the plug of that rivet. This arrangement is illustrated in FIGURE 1.

FIGURES 1, 2 and 3 illustrate successive stages in the use of the rivet to join two workpieces 43, 44. The workpieces are prepared by drilling through them a hole of diameter slightly larger than the outside diameter of the body 15 of the rivet shell (obviously the holes may be drilled separately in the workpieces and the workpieces then brought together to align the holes). A rivet of suitable length is selected to be used, the length of the body 15 of the rivet shell being somewhat longer than the combined thickness (known as the "grip length") of the workpieces. As illustrated in FIGURE 1, the rivet outside the jaws 32 of the riveting tool is offered up to the hole 15 and the rivet is inserted, plug first, through the hole, and the underside of the head of the rivet pressed lightly into contact with the nearer workpiece. The tool is then actuated to draw the mandrel into the jaws (i.e. from left to right in FIGURES 1 and 2) with some force. When this happens, the mandrel head 36 first contacts the flange 28 at the shell end of the plug of the rivet (if it has not already done so) and, exerting a force on that flange in the direction into the shell of the rivet, breaks the annular web 18 and draws the plug into the shell. FIGURE 2 illustrates the plug thus drawn about half way into the shell. The reaction force on the tool is supported by the part of the jaws immediately surrounding the mouth 33 abutting against the outer face of the head 14 of the rivet which in turn is pressed against the workpieces. Although the material of the rivet is somewhat resilient, it is not sufficiently resilient or compressible to allow the mandrel head 36 to deform the flange 28 of the plug while the part of the plug immediately outside that flange is restrained from outward radial deformation by the fairly close fitting wall of the bore 15 of the rivet shell.

The corrugations 21 of the outside of the plug are of course larger in diameter than the bore of the shell. Consequently, when the plug is drawn into the shell, distortion of both the wall of the shell and of the corrugated part of the plug occurs, as is illustrated in FIGURE 2. It will be seen that the increased diameter of the corrugations on the plug forces the shell wall to expand to completely fill the aperture 45 through the workpieces. At the same time the part of the plug which is thickened due to the corrugations is forced inwardly, so that the diameter of the bore through the plug is locally reduced opposite each exterior corrugation, as illustrated at 46 in FIGURES 2 and 3. The tapered face 41 of the mandrel head assists in accommodating this local reduction in diameter of the plug bore due to the adjacent corrugation 21, as is shown in FIGURE 2. The corrugations 21 also cause the tailmost part 47 of the shank, which projects beyond the workpieces, to expand radially outwards, thus squeezing or clenching the workpieces tightly together between this expanded tail part and the head 14 of the shell. As the mandrel head 36 continues to pull the plug into the shell, the tailmost corrugations 21 enter the shell. The fact that the tailmost corrugations are provided in the form of relatively thin and well spaced-apart ribs, which are relatively more easily compressed radially inwards (or bent over) by the shell, means that the tension required to be exerted by the mandrel does not increase towards the end of its stroke to such a high value as would be required if all the corrugations were solid. These ribs however are sufficiently effective in expanding the tailmost part 47 of the shell radially outwards.

The plug is drawn into the rivet shell until the flange 27 at the outer end of the plug abuts the tailmost end of the rivet shell, the tailmost part of the part 47 tending to curl radially inwards beyond the endmost corrugation 21 into the space around the cylindrical portion 26 of the plug. At this stage, the flange 28 at the other end of the plug has entered the radial enlargement 16 at the head end of the shell. This other end part of the plug is thus free from radial constraint by the walls of the shell, and the flange 28 expands radially, under the urging from the tapered face 38 of the mandrel head sufficiently that the restricted part 30 of the bore is enlarged to allow the mandrel head to pass through it, thus freeing the mandrel from the rivet. The very high radially outward stress applied to the flange 28 as it enlarges sufficiently to allow the mandrel head to pass through imparts a certain amount of permanent set to this part of the rivet plug. Thus this flange remains distorted in the direction in which the mandrel head has passed through its bore 30, and the end part of the plug remains distorted radially outwardly, in the way shown in FIGURE 3.

The plug is now firmly wedged within the shell and is positively locked therein by the inter-engaging corrugations on the exterior of the plug and the interior of the shell, across the interface between which there is a considerable thrust. The tailmost part 47 of the shell, behind the workpieces, is held expanded by the endmost corrugation of the plug to form a blind head on the rivet which firmly locks the rivet to the workpieces and firmly clenches the workpieces together.

The example rivet described above has a number of advantages. It provides a rivet which can be cheaply produced in very large numbers by moulding, and can be rapidly installed in quick repetition from a column of the rivets loaded on to the mandrel of a repetition placing tool as described.

The rivet described in the foregoing example can be installed in workpieces having a relatively wide range of grip lengths (i.e. combined thickness of workpieces), since an enlarged blind head at the tail end of the shell will always be formed provided that the part of the plug immediately beyond the blind face of the workpieces is thicker than the original diameter of the shell bore, i.e. provided that there is at least one corrugation 21 beyond the plane of the blind face of the workpiece when the plug is fully drawn into the shell as illustrated in FIGURE 3. Consequently the rivet of the foregoing example is useable over a range of grip lengths extending from approximately that shown in the accompanying drawings down to a minimum thickness which is determined by the mechanical strength of very thin workpieces.

The invention is not restricted to the details of the foregoing example. For instance, suitable synthetic materials other than nylon-66 may be employed to form the rivet. Various alterations in the shape and design of the rivet may be made. For example, a rivet may have a different head form, such as a conical under face to the head for a countersunk hole. The configuration of the thickened parts of the plug may be different from that shown in the aforegoing example, provided that the rivet functions satisfactorily in practice.

What is claimed is:
1. A blind rivet of substantially resilient material, comprising:
 a shell having an enlarged head at one end;
 and a plug at the tail end of said shell remote from said enlarged head;
 the exterior of said plug having circumferential corrugations which increase in diameter towards the tail end of said plug remote from said shell, and the tailmost part of said plug being weakened by a plurality of exterior longitudinal grooves;
 the rivet having a central longitudinal bore extending completely through both said shell and said plug;
 said bore through said plug being smooth, and said plug having an annular inwardly extending flange protruding into said bore at a position substantially adjacent the end thereof which is adjacent said shell, and said bore through said shell having an enlargement at its head end;

whereby when the rivet is positioned on a suitable mandrel having an enlarged head, with said mandrel passing through said rivet bore, and said mandrel is moved relative to said rivet in the direction towards the head thereof, said flange on the plug initially engages said mandrel head so that said plug is drawn into said shell thereby expanding at least said tail end part of said shell, and after said plug has been drawn into said shell the part of said plug at the said position may expand radially outwards into said enlargement in said bore of said shell, thereby to allow said flange to expand radially and said mandrel head to disengage from said plug.

2. A blind rivet as defined by claim 1 formed of nylon-66.

References Cited

UNITED STATES PATENTS

| | | | |
|---|---|---|---|
| 1,855,329 | 4/1932 | Wagner | 85—74 |
| 2,691,915 | 10/1954 | Cherry | 85—78 |
| 2,959,999 | 11/1960 | Wing | 85—75 |
| 3,313,083 | 4/1967 | Flora | 85—72 |

FOREIGN PATENTS

| | | |
|---|---|---|
| 536,476 | 5/1941 | Great Britain. |
| 1,082,813 | 9/1967 | Great Britain. |
| 1,093,714 | 12/1967 | Great Britain. |
| 1,435,652 | 3/1966 | France. |
| 245,773 | 3/1966 | Austria. |

EDWARD C. ALLEN, Primary Examiner

U.S. Cl. X.R.

85—72